United States Patent [19]
Rexford

[11] 3,724,477
[45] Apr. 3, 1973

[54] LAMINAR RATE SENSOR

[75] Inventor: Donald L. Rexford, Schenectady, N.Y.

[73] Assignee: General Electric Company, New York, N.Y.

[22] Filed: Jan. 10, 1972

[21] Appl. No.: 216,493

Related U.S. Application Data

[62] Division of Ser. No. 878,824, Nov. 21, 1969.

[52] U.S. Cl. ............................................. 137/81.5
[51] Int. Cl. ............................................. F15c 1/18
[58] Field of Search ................. 137/81.5; 235/201

[56] References Cited

UNITED STATES PATENTS

| | | |
|---|---|---|
| 3,310,985 | 3/1967 | Belsterling et al. .............. 137/81.5 X |
| 3,362,421 | 1/1968 | Schaffer .............................. 137/81.5 |
| 3,429,323 | 2/1969 | Mott .................................... 137/81.5 |
| 3,450,145 | 6/1969 | Colston ............................... 137/81.5 |
| 3,457,934 | 7/1969 | Kinner ................................. 137/81.5 |
| 3,469,593 | 9/1969 | O'Keefe ............................. 137/81.5 |
| 3,574,309 | 4/1971 | Kinner ................................. 137/81.5 |
| 3,636,964 | 1/1972 | Colamussi et al. ............. 137/81.5 X |
| 3,670,755 | 6/1972 | Nardi ................................... 137/81.5 |

*Primary Examiner*—Samuel Scott
*Attorney*—Allen E. Amgott et al.

[57] ABSTRACT

A laminar fluidic angular rate sensor for sensing the rate of angular rotation of the sensor which includes a supply passageway; at least two receiver passageways; vents, at least one of which is located between the two receiver passageways and is aligned with the supply passageways; and a cavity which are of a configuration and location such that fluid flowing through the supply passageway forms a laminar fluid stream which is capable of being received by the receiver passageways in the laminar state. The Reynolds number of the fluid forming the laminar fluid stream is preferably within the rante of 200-1500.

4 Claims, 9 Drawing Figures

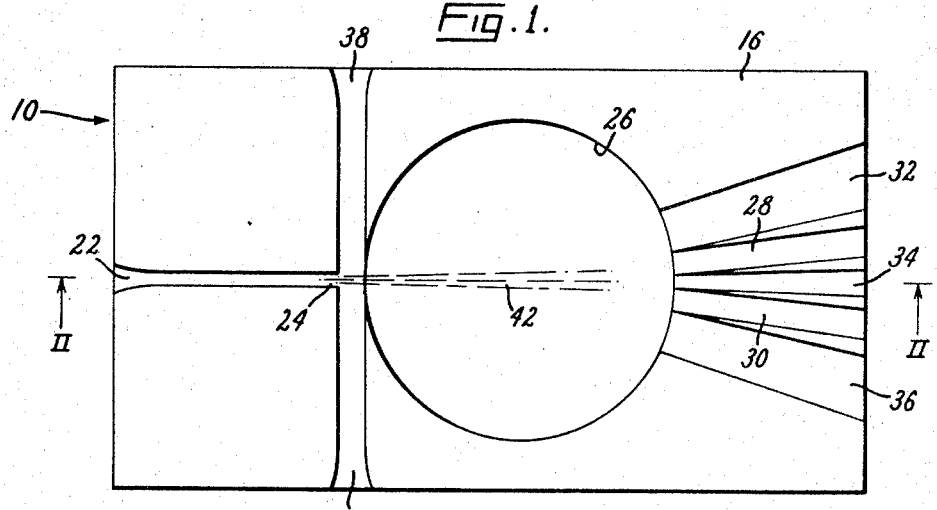
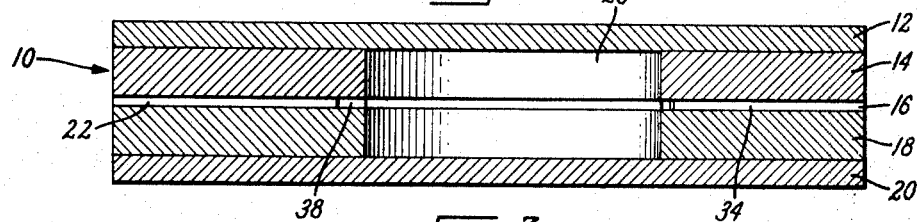
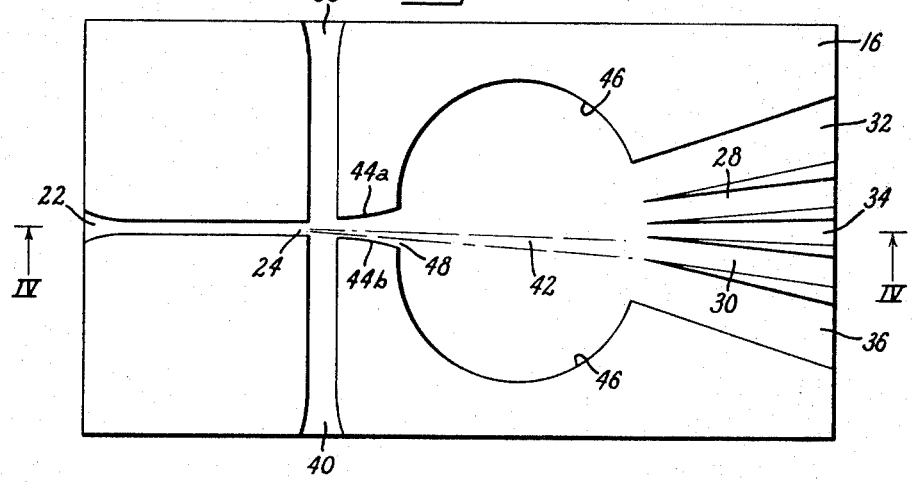
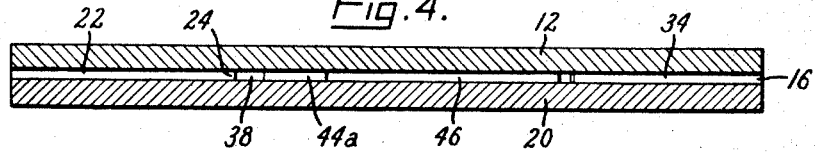

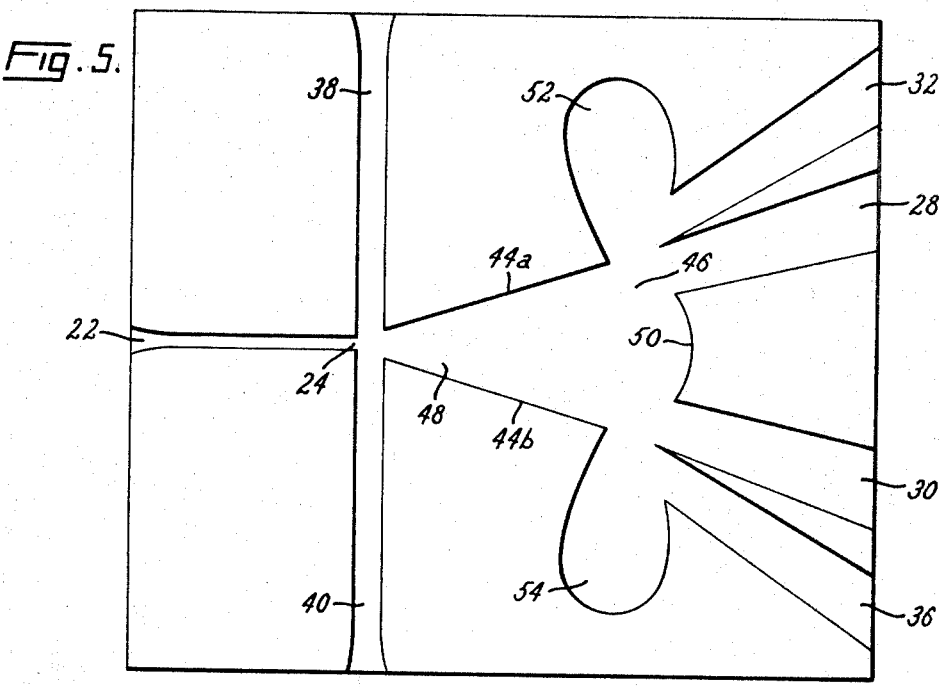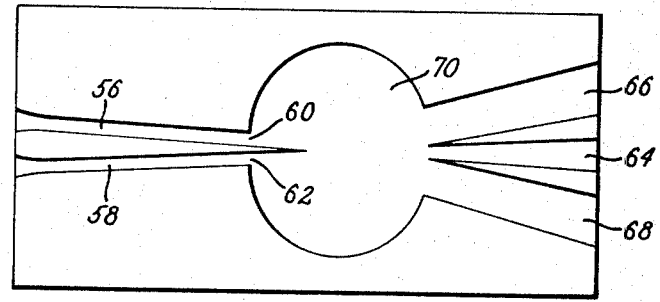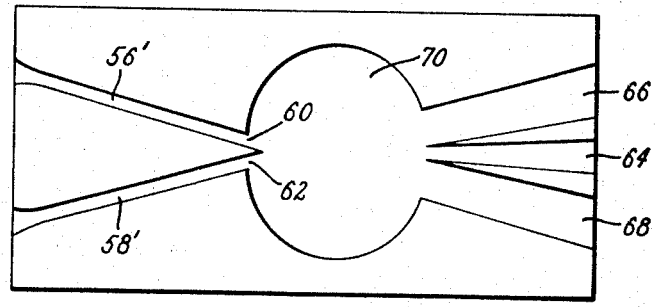

LAMINAR RATE SENSOR

This is a division, of application Ser. No. 878,824, filed Nov. 21, 1969.

BACKGROUND OF THE INVENTION

The subject invention generally relates to the area of fluidics and, in particular, to fluidic angular rate sensors which utilize a laminar flow stream.

Conventional state-of-the-art fluidic devices generally utilize a turbulent (i.e., non-laminar) fluid stream flowing from one or more supply passage ways to one or more receiver passageways. Such a turbulent fluid stream may assume a substantially linear or vortical path. Fluidic devices of this kind require a substantial pressure head of fluid and are inherently of very low efficiency with a low signal-to-noise ratio, due to the turbulence of the fluid stream. Turbulence amplifiers had been developed in which a laminar fluid stream is initially formed and flows from a supply passageway toward an aligned receiver passageway, and means are provided for causing the fluid stream to become turbulent in response to a control signal. Turbulence amplifiers are characteristically slow in response time due to the recovery time necessary to form a laminar fluid stream from a turbulent fluid stream once the control signals have been removed and also have a low signal-to-noise ratio.

SUMMARY OF THE INVENTION

Therefore it is an object of the subject invention to provide a fluidic angular rate sensor utilizing and maintaining a laminar fluid stream.

Another object is to provide a laminar fluidic angular rate sensor having a high signal-to-noise ratio at high efficiency.

The above-stated objects are fulfilled in the subject invention by providing a laminar fluidic angular rate sensor comprises of a substantially linear supply passageway for forming a laminar fluid stream, the length of the supply passageway being at least ten times the smallest cross-sectional dimension of the nozzle portion of the supply passageway; at least two substantially linear receiver passageways capable of receiving the laminar fluid stream and having a cross-sectional area no less than that of the nozzle portion; a closed cavity between the supply and receiver passageways; and venting means in communication with the cavity and located, at least in part, between the receiver passageway for helping to maintain the fluid stream in the laminar state.

The subject matter which is regarded as the present invention is particularly pointed out and distinctly claimed in the concluding portion of this specification.

BRIEF DESCRIPTION OF THE DRAWINGS

The present invention, however, together with further objects and advantages thereof, may best be understood by reference to the following description taken in connection with the accompanying drawings in which:

FIG. 1 is a schematic representation of a laminar fluidic proportional amplifier in accordance with the subject invention;

FIG. 2 is a cross-sectional view of the device shown in FIG. 1 taken along the line denoted II—II;

FIG. 3 is a schematic view of a laminar fluidic digital amplifier in accordance with the subject invention;

FIG. 4 is a cross-sectional view of the device shown in FIG. 3 taken along the line denoted IV—IV;

FIG. 5 is a schematic view of another embodiment of laminar fluidic digital amplifier in accordance with the subject invention;

FIG. 6 is a schematic representation of a laminar fluidic OR gate in accordance with the subject invention;

FIG. 7 is a schematic representation of a laminar fluidic AND gate in accordance with the subject invention;

DESCRIPTION OF THE PREFERRED EMBODIMENTS

Figure 8:
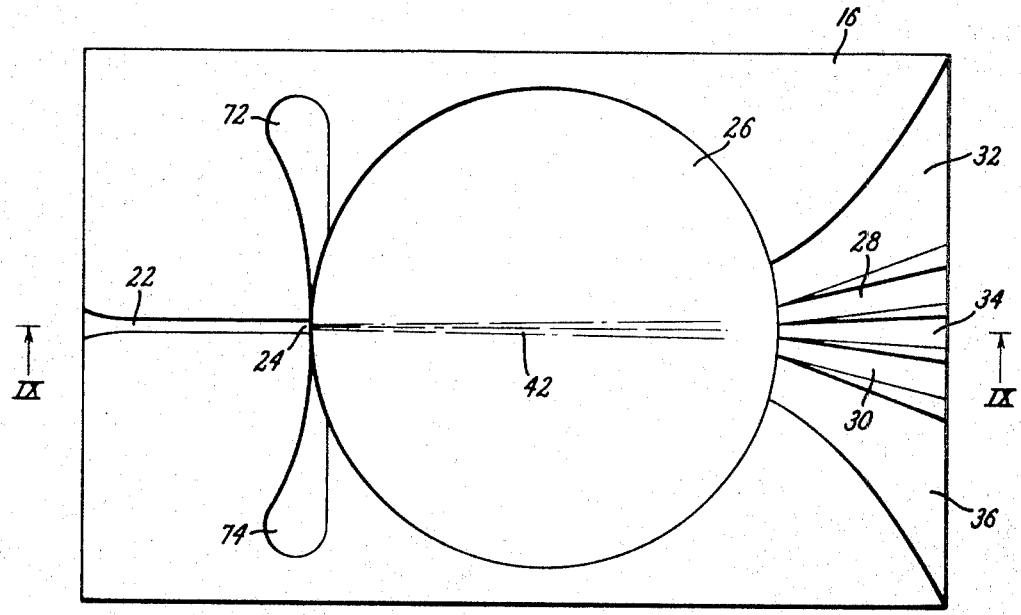
FIG. 8 is a schematic representation of a laminar fluidic angular rate sensor in accordance with the subject invention.

In FIGS. 1 and 2 a schematic representation of a laminar fluidic proportional amplifier 10 is shown. Amplifier 10 is formed by a plurality of laminated plates 12, 14, 16, 18, 20. Top and bottom plates 12, 20 are used as cover plates and center plates 14, 16, 18 have had portions removed therefrom by any suitable means, such as etching, drilling, coining, etc., to provide the desired structure.

The structure is comprised of a supply passageway 22 having a nozzle portion 24, an interaction cavity 26, two receiver passageways 28, 30, three vent passageways 32, 34, 36, and a pair of control passageways 38, 40.

Supply passageway 22 is used to form a laminar fluid stream denoted 42 flowing through cavity 26. Supply passageway 22 is substantially linear in shape and should be of a length at least ten times the smallest cross-sectional dimension of nozzle portion 24. The cross section of supply passageway 22 is preferably uniform along its length and may be of any desirable shape such as circular, oval, rectangular or square. For purposes of illustration, the passageways shown in the figures are rectangular in cross section. For the embodiments shown in FIGS. 1 and 2 the smallest cross-sectional dimension of nozzle portion 24 would be the height of the passageway at that point. If desired, passageway 22 may be slightly tapered.

Control passageways 38, 40 terminate adjacent the laminar fluid stream downstream of nozzle portion 24 and are preferably positioned upstream of the cavity so that the action of the control fluid in passageways 38, 40 on laminar fluid stream 42 serves only to deflect the stream and not to cause turbulence therein. The deflection of fluid stream 42 by control fluid in passageways 38, 40 is controlled by the difference in pressures between the control fluids in the two control passageways with little if any mixing of the control fluids with the fluid of the laminar fluid stream. To best effect this, it is preferable that the height of the control passageways be the same as the height of the nozzle portion. Also, it is generally desirable, depending upon the pressures of the fluids involved, and the desired sensitivity, to have the width of each control passageway greater than the width of nozzle portion 24, for example 1½ – 2 times as large. While each control passageway 38, 40 is shown to be at a right angle to supply passageway 22, this angular relationship is not necessary.

Interaction cavity 26 is closed, that is, it is connected only to the supply and receiver passageways and the vents and in an indirect manner to the control passageways. The configuration of cavity 26 is such that the laminar fluid stream flows therethrough while remaining in the laminar state.

For proper operation of the subject device, the fluid comprising fluid stream 42 should have a Reynolds number between 200 and 1,500 and the height of cavity 26 should either be greater than ten times the height of nozzle portion 24 or it should be substantially the same height as that of nozzle portion 24. For cavity heights between one and ten nozzle heights the fluid stream has a tendency to attach itself to the top or bottom of the cavity, while for nozzle heights less than one nozzle height turbulence can occur at the step from the nozzle to the shallower cavity.

Two substantially linear receiver passageways 28, 30 are provided with a central vent passageway 34 located therebetween and vent passageways 32, 36 located on the other side of each receiver passageways 28, 30, respectively. The three vent passageways make up the venting means for this embodiment with the central vent passageway 34 being substantially aligned with supply passageway 22. Generally it is desirable that the cross-sectional area of receiver passageways 28, 30 at their fluid input portion be at least as large as the cross-sectional area of nozzle portion 24, and preferably 1½ – 2 times as great. Receiver passageways 28, 30 are configured so that the laminar fluid stream 42 can flow therethrough with little impedance. It is therefore desirable that the passageways be either of substantially constant cross-section or slight divergent.

Vent passageways 32, 34, 36 are of a configuration such that there is substantially no impedance to fluid flow therethrough to prevent disturbance of laminar fluid stream 42. It is undesirable for the vent passageways to either impede the flow of fluid or pull fluid therethrough as a result of venturi suction caused by an unrestricted diffusion in the vent. In effect, the vent passageways should act as open windows. In order to maintain fluid stream 42 in laminar state, the venting means should be provided adjacent and as close as possible to the upstream portion of the receiver passageways.

The output of proportional amplifier 10 is a pressure differential in the receiver passageways proportional to the difference in fluid pressures in control passageways 38, 40. In operation, a pressurized fluid with a Reynolds number less than 1,500 and preferably between 200 and 1,500 is supplied to supply passageway 22 to form laminar fluid stream 42. Control fluid, ducted to control passageways 38, 40 acts on laminar fluid stream 42 exiting from nozzle portion 24 to deflect that stream proportionally to the difference in pressures of the control fluid in the control passageways. If the pressures are equal, the stream will not be deflected and most of fluid stream 42 will enter central vent 34 with a substantially equal percentage of fluid entering receiver passageways 28 and 30, thereby providing a zero pressure differential output. If, for example, the pressure in control passageway 40 were greater than that in passageway 38, fluid stream 42 would be deflected so that a greater proportion of the fluid stream would exit through receiver passageway 28 than through passageway 30 thereby providing a pressure differential output proportional to the control pressure differential.

One way the gain of the proportional amplifier can be changed is by changing the length of interaction cavity 26. Generally, the longer the cavity, the higher the gain. It is generally desirable however, that the cavity be no longer than 50 times the smallest cross-sectional dimension of the nozzle portion, as the laminar fluid stream 42 begins to become marginally stable at greater lengths.

The embodiment shown in FIGS. 3 and 4 is one form of laminar fluidic digital amplifier. The structure shown is similar to that shown in FIGS. 1 and 2 with similar structured supply passageway 22, control passageways 38, 40 receiver passageways 28, 30 and vent passageways 32, 34 and 36. The major difference is that wall means 44 are provided between control passageways 38 and a cavity 46. Wall means 44, which includes two wall surfaces, defines, in part, a channel 48 having a height substantially equal to that of nozzle portion 24. Channel 48, at least a portion of which is divergent, has a minimum width no less than the width of the nozzle portion 24. The wall surfaces are positioned such that when the fluid stream becomes attached to one of wall surfaces 44, the fluid stream flows substantially directly through one of receiver passageways 28, 30 depending onto which wall surface it is attached.

In this embodiment cavity 46 is shown as having a height substantially equal to the height of nozzle portion 24. However, as explained above, a cavity having a height at least 10 times as great as the height of nozzle portion 24 may also be used.

In operation, the digital amplifier shown in FIGS. 3 and 4 acts as a bi-stable device with fluid stream 42 being stable only when it is attached to one of wall surfaces 44. When the pressure of the control fluid in one of the control passageway, for example 40, is greater than the pressure in the other control passageway, fluid stream 42 is deflected so as to become attached, by the wall attachment effect, to a wall surface 44, in this example, the lower one, and exits primarily through one of the receiver passageways, in this example passageway 28. Fluid stream 42 remains this way until the pressure of the control fluid in the other control passageway, passageway 38, becomes sufficiently greater than the pressure in control passageway 40 to cause fluid stream 42 to be deflected away from the lower wall surface. Fluid stream 42 then becomes attached to the other wall surface 44, the upper one, and exits primarily through the other receiver passageway, passageway 30. Fluid stream 42 remains laminar throughout the operation of the device. Such a bi-stable device is commonly known as a flip - flop.

In FIG. 5 another embodiment of laminar fluidic digital amplifier is shown. The apparatus in FIG. 5 differs from that shown in FIGS. 3 and 4 principally from the standpoint of the venting means used. In place of the central vent passageway, 34, the device of FIG. 5 uses a centrally located cusp 50 and a pair of vents 52, 54 located on opposite sides of interaction cavity 46. Cusp 50 is used to deflect fluid which is not able to enter one of receiver passageways 28, 30 to one of the vents 52, 54 without disturbing the laminar state of fluid stream. For example, if the laminar fluid stream is attached to the upper wall surface, the stream will be directed toward receiver passageway 28 with most of the fluid flowing therethrough. A small amount of the fluid stream including fluid from interaction cavity 46 which is entrained therein will exit through vent passageway 32 and a small amount will be deflected by cusp 50 and exit out through vent 54. Except for the venting, the operation of the device shown in FIG. 5 is exactly the same as the operation as the device shown in FIGS. 3 and 4.

In FIG. 6 a laminar fluidic OR gate is shown. In this device two substantially linear supply passageways 56, 58 angled in toward each other are provided. Each supply passageway 56, 58 has its own nozzle portion 60, 62, respectively, and bears the same dimensional relationship therewith as supply passageway 22, discussed above. The angle between supply passageways 56, 58 is preferably no greater than 45° to insure that the fluid streams flowing from the supply passageways remain laminar. One central receiver passageway 64 with two vent passageways 66, 68 adjacent thereto are provided. Cavity 70 is located between the receiver and vent passageways and the supply passageways. The inlet of receiver passageway 64 is substantially aligned with both supply passageways 56, 58 so that when fluid flows through either or both supply passageways 56, 58 fluid flows out through receiver passageway 64 to provide a fluid pressure signal. In the embodiments shown, cavity 70 as well as all the passageways are shown to be of the same height, although cavity 70 may have a height at least 10 times the height of nozzle portion 60, 62.

In FIG. 7 a laminar fluidic AND gate is shown which utilizes a structure similar to the OR gate structure in FIG. 6. Like the OR gate structure shown in FIG. 6, supply passageways 56', 58' should have an angle therebetween no greater than 45°. The difference between the structure of the OR gate of FIG. 6 and the AND gate of FIG. 7 lies in the alignment of the receiver passageway 64 and vent passageways 66, 68 relative to supply passageways 56', 58'. In the structure shown in FIG. 7 each supply passageway 56, 58 is aligned with a vent passageway 68, 66, respectively and receiver passageway 64 is aligned with a line substantially bisecting the angle between supply passageways 56' and 58'.

In operation, when fluid flows through either supply passageway 56' or 58', the laminar fluid stream formed thereby exits through vent passageway 68 or 67 with substantially no fluid flowing through receiver passageway 64. When fluid flows through both supply passageways 56', 58' both laminar fluid streams are deflected to form a single laminar fluid stream which flows through receiver passageway 64 thereby providing a fluid pressure indication of the presence of fluid flow in both supply passageways.

Both the OR gate and the AND gate of FIGS. 6 and 7 are passive devices in that the control fluid flow, which is the fluid flowing through the supply passageways, directly provide the fluidic operation; i.e., they do not act on a non-control fluid power stream.

Figure 9:
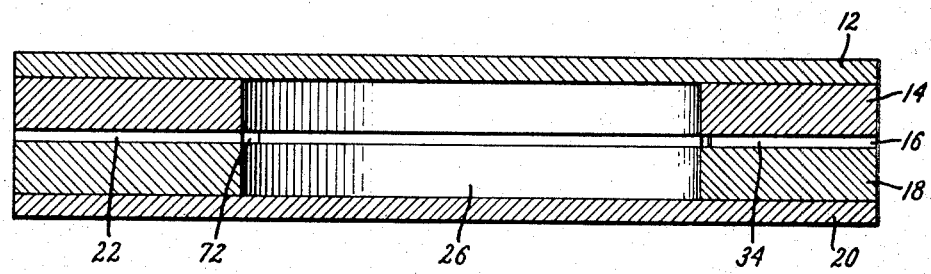
FIG. 9 is a cross-sectional view of the device shown in FIG. 8 taken along the line denoted IX—IX.

In FIGS. 8 and 9 a laminar fluidic angular rate sensor is shown. The structure of the angular rate sensor is somewhat similar to that of the proportional amplifier shown in FIGS. 1 and 2, differing primarily in that no control passageways are provided. Supply passageway 22, cavity 26, receiver passageways 28, 30 and vent passageways 32, 34, 36 are all provided. The venting means for the angular rate sensor may also include additional vents 72, 74 which communicate with cavity 26 near nozzle portion 24. Supply passageway 22 is at least ten times as long as the smallest cross-sectional dimension of nozzle portion 24. Central vent passageway 34 is aligned with supply passageway 22 and receiver passageways 28, 30 are symetrically placed with respect thereto.

In operation a pressurized fluid is caused to flow through supply passageway 22 to form a laminar fluid stream. Like all the embodiments, in order to provide a fluid stream in a laminar state it is preferable that the fluid flowing through supply passageway 22 have a Reynolds number of between 200 and 1,500. As the angular rate sensor is rotated in the plane of the surface shown in FIG. 8 (which plane includes the exit of supply passageway 22 and the entrances of receiver passageways 28, 30), laminar fluid stream 42 is deflected in a direction opposite to that of the rotation. For example, when the device is not being rotated, laminar fluid stream 42 will exit through central vent passageway 34 with a substantially equal, but small amount exiting through receivers 28 and 30 thereby producing a zero pressure differential between the two receiver passageways 28, 30. If the device is rotated in a clock-wise direction in the plane of the surface shown in FIG. 8, fluid stream 42 will be deflected so that more fluid enters receiver passageway 28 than enters receiver passageway 30 thereby providing a pressure differential between and within the two receiver passageways which is proportional to the angular rate of rotation of the device within the plane. Preferably receiver passageways 28, 30 are located such that when the device is being rotated at the maximum angular rate to be sensed, substantially all the fluid stream will enter one of the receiver passageways 28, 30 depending on the direction of the rotation. The use of the particular venting means shown helps to permit fluid stream 42 to remain in the laminar state even when the device is being rotated. Cavity 26 is shown as having a height at least ten times as great as the height of nozzle portion 24. Alternatively cavity 26 may be of substantially the same height as nozzle portion 24. The shapes of the cavities shown in the figures are merely representative of the shapes that may be used, subject to the height limitation discussed above. The shape of the cavity determines, at least in part, the venting means that should be used to maintain the fluid stream in the laminar state.

Many other embodiments and modifications, in addition to those discussed above, are intended to be included within the scope of the subject invention.

Additionally, the subject invention may be used in three-dimensional fluidic devices wherein additional vents, receivers, and control passageways, as necessary would be provided.

Thus the subject invention provides a laminar fluidic angular rate sensor which is characterized by the use of a laminar fluid stream. The laminar fluid stream is provided by using a fluid having a Reynolds number less than 1,500 and preferably between 200 and 1,500 in a structure having two supply nozzle of a length at least ten times as great as the smallest cross-sectional dimension of the nozzle end of the supply passageway, at least two linear receiver passageway having a cross-sectional area at least as great as the nozzle portion and venting means, at least a portion of which is located adjacent the receiver passageway and being in communication with a cavity located between the supply and receiver passageways to maintain the fluid stream in a laminar state.

The scope of the subject invention is to be limited only by the appended claims.

What I claim and desire to secure by Letters Patent in the United States is:

1. A laminar fluidic angular rate sensing device for sensing the rate of angular rotation of the device in a plane for use with a fluid having a Reynolds number less than 1,500 comprising:
  a. a substantially linear supply passageway having at its downstream end a nozzle portion for forming a laminar fluid stream, the length of said supply passageway being at least 10 times the smallest cross-sectional dimension of said nozzle portion;
  b. two substantially linear receiver passageways capable of receiving a portion of said laminar fluid stream from said supply passageway, the cross-sectional area of each of said receiver passageways being no less than the cross-sectional area of said nozzle portion;
  c. a substantially closed cavity located between said supply and receiver passageways and through which said laminar fluid stream flows; and
  d. venting means in communication with said cavity a portion of which is located between said receiver passageways for helping to maintain said fluid stream flowing through said cavity in the laminar state by presenting substantially no impedance to fluid flow therethrough; whereby rotation of said device in a plane which includes the exit of said supply passageway and the entrances of said receiver passageways causes deflection of said laminar fluid stream to produce a pressure differential between and within said receiver passageways which is proportional to the angular rate of rotation of said device within the plane.

2. A device as in claim 1 wherein the height of said cavity is substantially the same as the height of said nozzle portion.

3. A device as in claim 1 wherein the height of said cavity is at least ten times a great as the height of said nozzle portion.

4. A device as in claim 1 wherein the length of said cavity is no greater than 50 times the smallest cross-sectional dimension of said nozzle portion.

* * * * *